(12) United States Patent
Kim

(10) Patent No.: US 10,180,173 B2
(45) Date of Patent: Jan. 15, 2019

(54) ENGINE MOUNT

(71) Applicant: Hyundai Motor Company, Seoul (KR)

(72) Inventor: Seung-Won Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/069,116

(22) Filed: Mar. 14, 2016

(65) Prior Publication Data

US 2017/0152911 A1 Jun. 1, 2017

(30) Foreign Application Priority Data

Dec. 1, 2015 (KR) .......................... 10-2015-0169635

(51) Int. Cl.
*F16F 13/10* (2006.01)
*B60K 5/12* (2006.01)
*F16F 13/20* (2006.01)

(52) U.S. Cl.
CPC .......... *F16F 13/107* (2013.01); *B60K 5/1208* (2013.01); *F16F 13/10* (2013.01); *F16F 13/20* (2013.01)

(58) Field of Classification Search
CPC ........ F16F 13/10; F16F 13/105; F16F 13/106; F16F 13/107; F16F 13/20; B60K 5/1208
USPC ................................................... 267/140.13
See application file for complete search history.

(56) References Cited

U.S. PATENT DOCUMENTS

| 5,462,261 | A | * | 10/1995 | Eckel | F16F 13/262 267/140.13 |
|---|---|---|---|---|---|
| 6,439,554 | B1 | * | 8/2002 | Takashima | F16F 13/26 267/140.13 |
| 2001/0010413 | A1 | * | 8/2001 | Takashima | F16F 13/26 267/140.13 |
| 2003/0024593 | A1 | * | 2/2003 | Anzawa | F16F 13/268 140/14 |
| 2003/0071401 | A1 | * | 4/2003 | Kodama | F16F 13/101 267/140.13 |

(Continued)

FOREIGN PATENT DOCUMENTS

| DE | 3239787 A1 * | 9/1983 |
|---|---|---|
| JP | 2001-214953 A | 8/2001 |
| JP | 2010-32024 | 2/2010 |

(Continued)

*Primary Examiner* — Melody M Burch
(74) *Attorney, Agent, or Firm* — Mintz Levin Cohn Ferris Glovsky and Popeo, P.C.; Peter F. Corless

(57) ABSTRACT

An engine mount is provided that includes a nozzle plate that is mounted between an insulator and a diaphragm to divide the interior into upper and lower fluid chambers to enable the flow of hydraulic fluid between the chambers through a first flow path formed in the nozzle plate according to variation in the volume of the interior. The nozzle plate includes a second flow path and a division cup that has an upwardly protruding portion to push the diaphragm to divide the lower fluid chamber into a main fluid chamber communicating with the flow path and an auxiliary fluid chamber communicating with the second flow path. A partition is formed inside the protruding portion to form a chamber below the auxiliary fluid chamber, and an introduction/discharge aperture is formed in the partition to enable introduction or discharge of air into or from the chamber.

3 Claims, 6 Drawing Sheets

(56) References Cited

U.S. PATENT DOCUMENTS

2010/0219570 A1* 9/2010 Kojima ................ F16F 13/264
  267/140.13
2013/0256960 A1* 10/2013 Marienfeld ........... F16F 13/264
  267/140.14

FOREIGN PATENT DOCUMENTS

| JP | 2010-255831 A | 11/2010 |
| JP | 5-118376 B2 | 1/2013 |
| JP | 2013-036540 A | 2/2013 |
| JP | 2013-228004 A | 11/2013 |
| KR | 10-2012-0051447 A | 5/2012 |
| KR | 10-1288997 B1 | 7/2013 |

* cited by examiner

ENGINE MOUNT

CROSS-REFERENCE TO RELATED APPLICATION

This application claims the priority benefit of Korean Patent Application No. 10-2015-0169635, filed on Dec. 1, 2015 in the Korean Intellectual Property Office, the disclosure of which is incorporated herein by reference.

BACKGROUND

1. Field of the invention

The present invention relates to an engine mount mounted to attenuate vibrations generated in an engine and to support the weight of the engine, and more particularly, to an engine mount having a self-variation property, which may vary vibration attenuation characteristics based on driving conditions even when a separate drive mechanism is not provided, thereby more efficiently attenuating vibrations within different frequency ranges.

2. Description of the Related Art

A general hydraulic mount (e.g., fluid-filled mount) is typically filled with a predetermined amount of hydraulic fluid to attenuate vibrations via the flow of the hydraulic fluid. The hydraulic mount entails higher production costs compared to a pneumatic mount, but is advantageous in terms of performance, and therefore the application range thereof is gradually increasing.

However, since vibrations generated in a vehicle may be transmitted through the road surface as well as through the engine and the characteristics of the generated vibrations may vary based on the conditions in which the vehicle is being driven, the use of a general hydraulic mount is limited to the simultaneous attenuation of vibrations having different frequency ranges. Therefore, an active amount has been developed based on the hydraulic mount. The active mount is capable of actively controlling vibration attenuation characteristics to more efficiently attenuate vibrations within a specific frequency range.

Particularly, the characteristics of the active mount may be controlled by switching the supply of current on or off. A volume-stiffness type active mount, in which the behavior of a vibrating membrane is controlled via the flow of hydraulic fluid, and a bypass-type active mount, in which a second flow path (e.g., for communication between an upper fluid chamber and a lower fluid chamber) is additionally formed and communication via the second flow path is controlled, are widely used.

Among these, describing the conventional bypass-type active mount with reference to FIG. 1, an elastic insulator 2 coupled to a core 1 is mounted in the upper region of a case, a diaphragm 4 is coupled to the lower end of the case, and a nozzle plate 3 is mounted between the insulator 2 and the diaphragm 4 to divide the interior space into an upper fluid chamber and a lower fluid chamber. The nozzle plate 3 has an annular flow path formed inside the periphery thereof to allow hydraulic fluid therein to flow between the upper fluid chamber and the lower fluid chamber. The flow of hydraulic fluid is induced as the inner volume of the upper fluid chamber increases or decreases when the insulator 2 coupled to the core 1 is elastically deformed by load and vibrations transmitted from an engine.

In addition, a second flow path is provided in the center of the nozzle plate 3 to enable additional communication between the upper fluid chamber and the lower fluid chamber in the vertical direction, and a rod 5 is disposed below the second flow path to connect the upper end to the diaphragm 4 to be movable vertically. A spring (not illustrated) is coupled to the rod 5 to provide the rod 5 with elastic force in the direction in which the rod 5 closes the second flow path (i.e. in the upward movement direction of the rod 5), and a coil 6 is disposed proximate to the rod 5. In addition, when power is applied to the coil 6, the rod 5 is moved downward by electromagnetic force, whereby additional communication between the upper fluid chamber and the lower fluid chamber is implemented via the second flow path.

However, since the active mount requires the additional mounting of a drive mechanism (e.g., including the rod, spring, coil and power application device) to the fluid-filled mount, consumption current is increased due to the addition of the drive mechanism, which may have a negative effect on fuel efficiency and may result in increased production costs and weight.

SUMMARY

Therefore, the present invention provides an engine mount in which the flow characteristics of hydraulic fluid are self-variable (self-convertible) based on the characteristics of vibrations input under various driving conditions even when a drive mechanism is omitted, thereby achieving improved damping performance and noise, vibration and harshness (NVH) performance (i.e. increasing the coefficient of loss and reducing dynamic characteristics).

More specifically, the engine mount according to the present invention has both volume-stiffness type and bypass-type features (as described above) to further increase vibration attenuation efficiency. In other words, the engine mount of the present invention has a bypass-type feature, that is, the formation of a second flow path, and a volume-stiffness type feature, whereby the vertical movement of the bottom of an auxiliary fluid chamber (e.g., when regarding the bottom of the auxiliary fluid chamber as a membrane) may be adjusted by the introduction/discharge of air. Thus, the engine mount of the present invention may be regarded as a combination of the two types.

Technical objects to be achieved by the present invention are not limited to those mentioned above, and other objects may be clearly understood by those skilled in the art from the description given below.

In accordance with an exemplary embodiment of the present invention, the above and other objects may be accomplished by the provision of an engine mount that may include a nozzle plate mounted between an insulator and a diaphragm to divide an interior of the engine mount into an upper fluid chamber and a lower fluid chamber to allow filled hydraulic fluid to flow between the upper fluid chamber and the lower fluid chamber through a flow path formed in the nozzle plate based on variation in the volume of the interior. The nozzle plate may include a second flow path, an upper end of which communicates with the upper fluid chamber, and a division cup having an upwardly protruding portion configured to push the diaphragm from a lower side thereof to divide the lower fluid chamber into a main fluid chamber, which communicates with the flow path, and an auxiliary fluid chamber, which communicates with the second flow path. A partition may be formed inside the protruding portion to form a chamber below the auxiliary fluid chamber, and an introduction/discharge aperture may be drilled or otherwise formed in the partition to allow air to be introduced into or discharged from the chamber.

Further, the nozzle plate may include an expanded portion having a pipe shape, and the expanded portion may extend downward from the nozzle plate to expand a length of the second flow path. The introduction/discharge aperture may have a tapered upper end, a diameter of which may increase in an upward direction. The diaphragm may be shaped to have a plurality of pleats, and the protruding portion may be configured to push the diaphragm to cause any one of the pleats to abut a bottom of the nozzle plate. The division cup may be fixed to a lower end of a case, which may be coupled to an exterior of the diaphragm and the insulator. The auxiliary fluid chamber may have a side surface coupled to a plate to be closely fixed to an inner circumferential surface of the protruding portion. The auxiliary fluid chamber may have an upwardly convex bottom.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
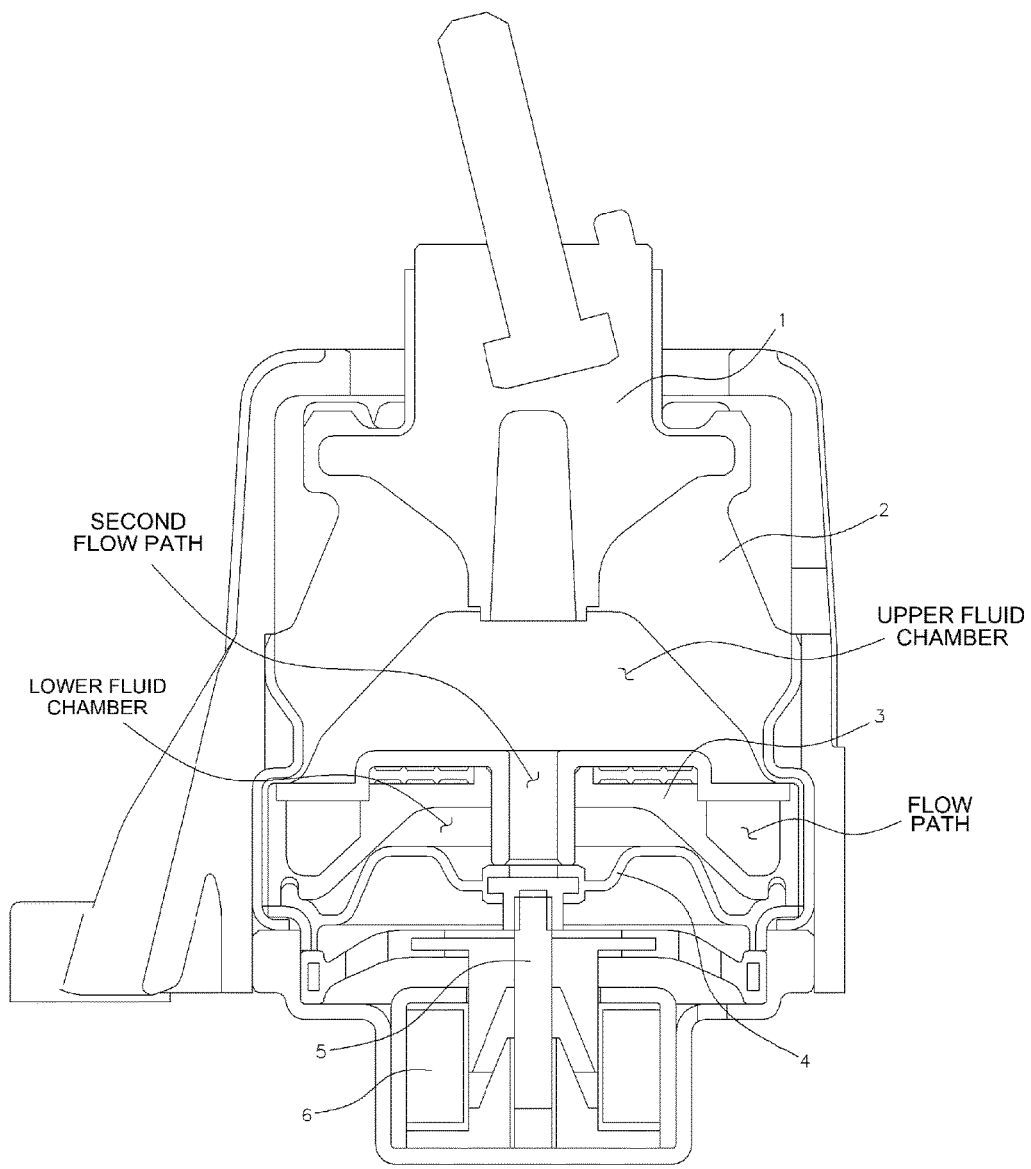
FIG. 1 is a longitudinal sectional view illustrating a conventional active amount according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described in detail with reference to the accompanying drawings to allow those skilled in the art to easily practice the present invention. However, the present invention may be embodied in many different forms and is not limited to exemplary embodiments described herein. In the drawings, to clearly describe the present invention, parts extrinsic to the description are not illustrated, and the same or similar elements are denoted by the same reference numerals even though they are depicted in different drawings. In addition, the terms or words used in the specification and claims of the present invention are not interpreted using typical or dictionary limited meanings, and are constructed as meanings and concepts conforming to the technical sprit of the present invention based on the principle that the inventors can appropriately define the concepts of the terms to explain the present invention in the best manner.

Figure 2:
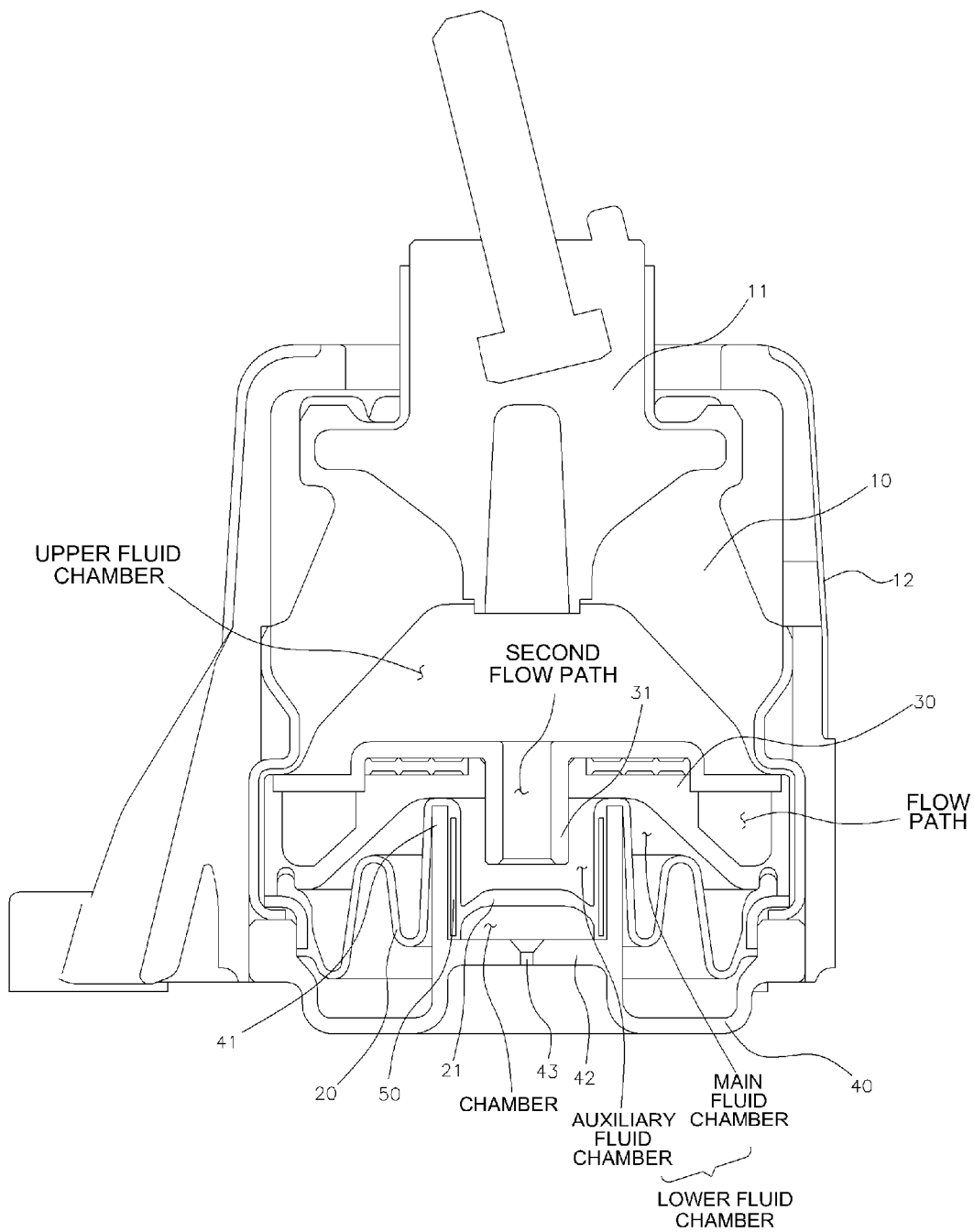
FIG. 2 is a longitudinal sectional view illustrating an engine amount according to an exemplary embodiment of the present invention.
Figure 3:
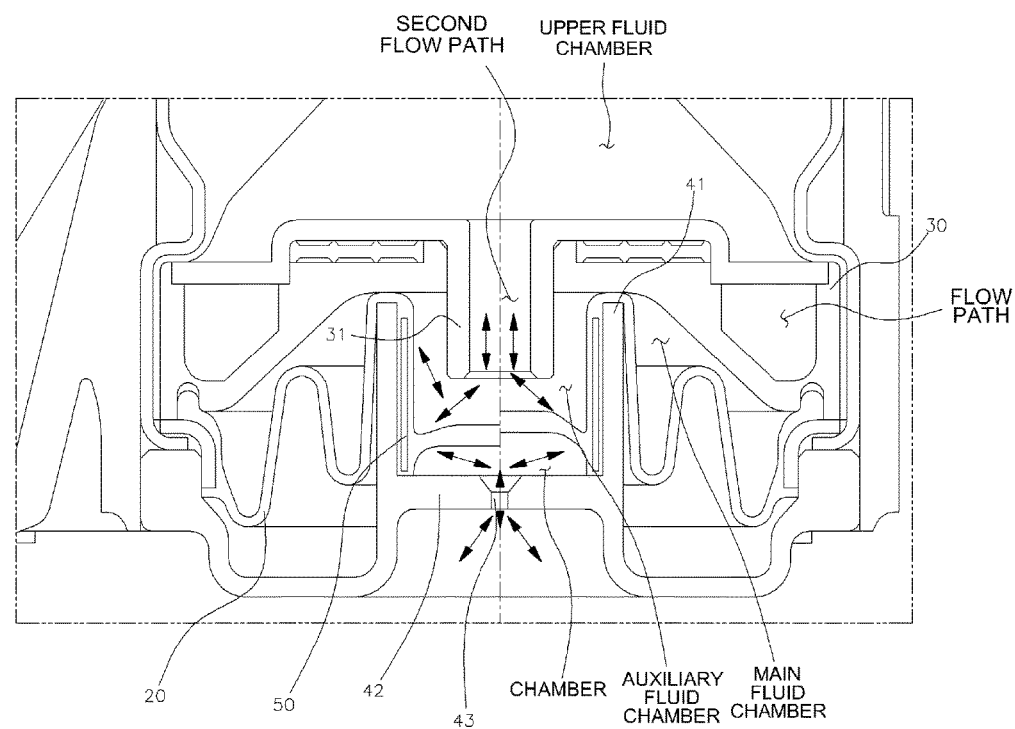
FIG. 3 is an enlarged view of a partial region of FIG. 2 in which a nozzle plate and a division cup are mounted (the left side illustrating the downwardly moved state of the bottom of an auxiliary fluid chamber and the right side illustrating the upwardly moved state of the bottom of the auxiliary fluid chamber), in which the flow of hydraulic fluid through a second flow path and the flow of air through an introduction/discharge aperture are indicated by arrows according to an exemplary embodiment of the present invention.

Referring to FIGS. 2 and 3, similar to the previously described conventional hydraulic engine mount, an engine mount of the present invention may include an elastic insulator 10 coupled to a core 11 and mounted in the upper region of a case 12; a diaphragm 20 coupled to the lower end of the case 12; and a nozzle plate 30 mounted between the insulator 10 and the diaphragm 20 to divide the interior space into an upper fluid chamber and a lower fluid chamber.

The nozzle plate 30 may have an annular flow path formed inside the periphery thereof to allow hydraulic fluid therein to flow to the upper fluid chamber and the lower fluid chamber. The flow of hydraulic fluid may be induced as the inner volume of the upper fluid chamber increases or decreases when the insulator 10 is elastically deformed by load and vibrations transmitted from an engine.

In addition, a division cup 40 may be disposed below the diaphragm 20 and may be secured to the lower end of the case 12. The division cup 40 may include an upwardly protruding portion 41 configured to push the diaphragm 20 from the lower side thereof to divide the lower fluid chamber into a main fluid chamber, which communicates with a flow path, and an auxiliary fluid chamber, which communicates with a second flow path. A partition 42 may be formed inside the protruding portion 41 to form a chamber below the auxiliary fluid chamber. An introduction/discharge aperture 43 may be drilled in the partition 42 to enable the introduction and discharge of air into or from the chamber.

Accordingly, when hydraulic fluid flows through the second flow path, the volume inside the auxiliary fluid chamber may vary thus causing the bottom 21 of the auxiliary fluid chamber to be moved vertically as illustrated in FIG. 3. Therefore, the volume of the chamber may also vary, causing the introduction or discharge of air the through the introduction/discharge aperture 43. Further, since the volume of the auxiliary fluid chamber may also vary in response to the introduction or discharge of air, it will be easily understood by those skilled in the art that the damping characteristics of the auxiliary fluid chamber may be set by adjusting the amount of air introduced or discharged from the chamber.

Moreover, in the exemplary embodiment of the present invention, an expanded portion 31 having a pipe shape may be formed at the underside of the nozzle plate 30 and may expand the length of the second flow path to concentrate pressure on the bottom 21 of the auxiliary fluid chamber during the flow of hydraulic fluid. Although the length of the expanded portion 31 may change based on the required characteristics of the engine, it may be set to be optimized to efficiently attenuate vibrations within a specific frequency range (e.g. vibrations within a range from about 20 Hz to 30 Hz).

In addition, to concentrate the flow of air on the introduction/discharge aperture 43 when air is introduced or discharged from the chamber to maximize tuning effects, the upper end of the introduction/discharge aperture 43 may be shaped to have a diameter that increases in an upward direction. Conversely, the lower end of the introduction/discharge aperture 43 may be shaped to have a diameter that decreases in a downward direction.

In the exemplary embodiment of the present invention, the diaphragm 20 may be shaped to include a plurality of pleats, and the protruding portion 41 may be configured to push the diaphragm 20 to cause any one of the pleats to be brought into contact with (e.g., to abut) the bottom of the nozzle plate 30. The division cup 40 may be secured to the lower end of the case 12, which may be coupled to the exterior of the diaphragm 20 and the insulator 10, by, for example, curling or welding (but is not limited to such securing methods). The bottom 21 of the auxiliary fluid chamber may be shaped to be convex upward with a predetermined curvature to more easily undergo vertical movement and to ensure the concentration of pressure during the flow of the hydraulic fluid as described above.

Additionally, although the side surface of the auxiliary fluid chamber may be attached to the inner circumferential surface of the protruding portion 41 using an adhesive applied thereto (without a support member), to allow the side surface to come into close contact with (e.g., to abut) the protruding portion 41 without behaving elastically, the side surface may be affixed to the inner circumferential surface of the protruding portion 41 while being coupled to a plate 50 since the diaphragm 20 may be formed of an elastic material and may be difficult to completely attach when assembling the division cup 40.

The plate 50 may be formed of a plastic material having a predetermined rigidity, and may secure the side surface of the auxiliary fluid chamber when the volume of the auxiliary fluid chamber varies, to thus prevent the generation of vibration noise and concentrate the pressure of the hydraulic fluid on the bottom of the auxiliary fluid chamber. The present invention having the above-described configuration may be operated to change the flow path of the hydraulic fluid to optimize damping efficiency in the respective cases of idling and driving, in which vibrations having different characteristics occur.

Figure 4:
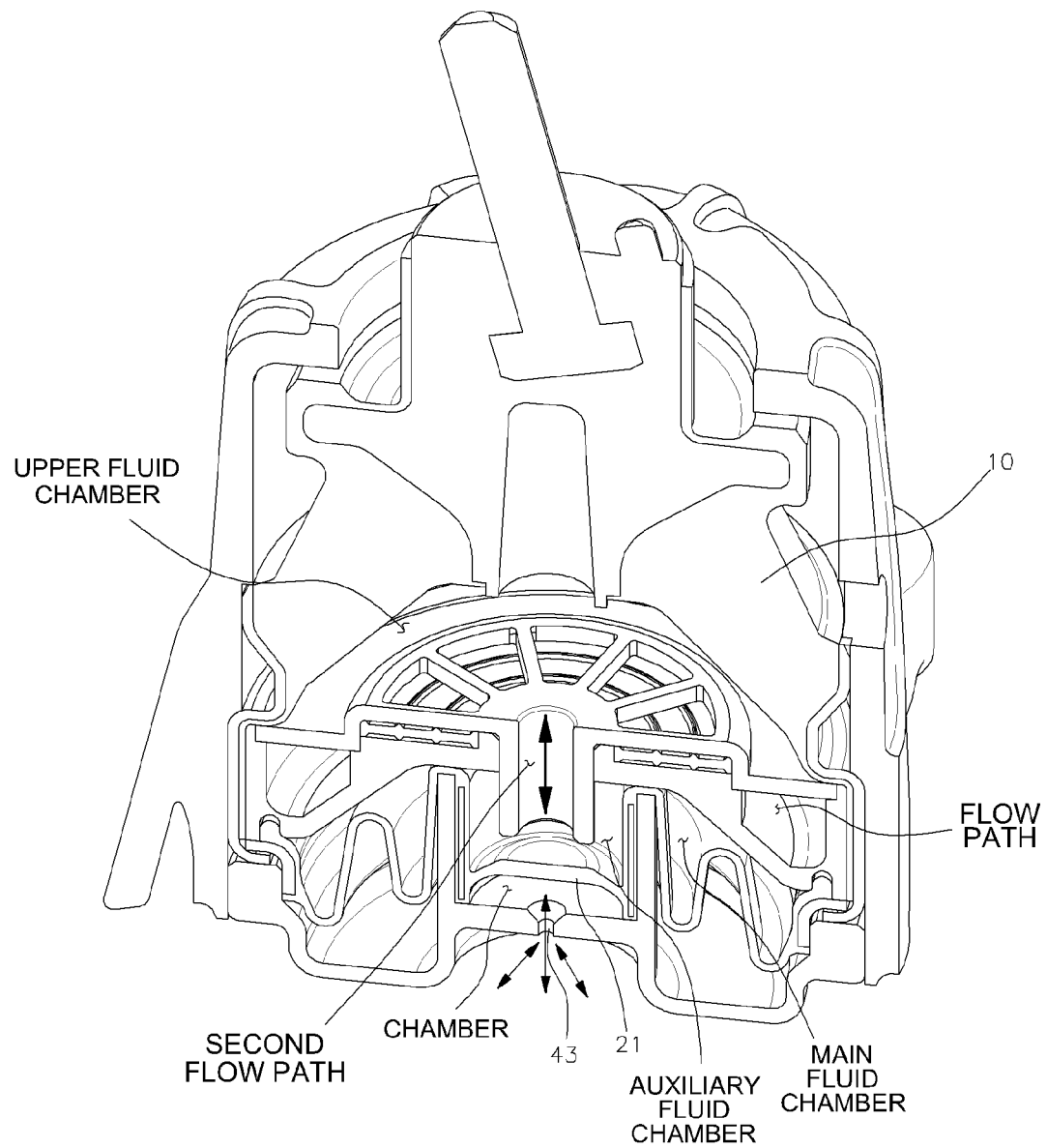
FIG. 4 is a view illustrating the state in which the flow of hydraulic fluid through the second flow path occurs and the flow of air through the introduction/discharge aperture occurs when vibrations having a relatively minimal amplitude (small-displacement vibrations) are generated during idling according to an exemplary embodiment of the present invention.
Figure 6A:
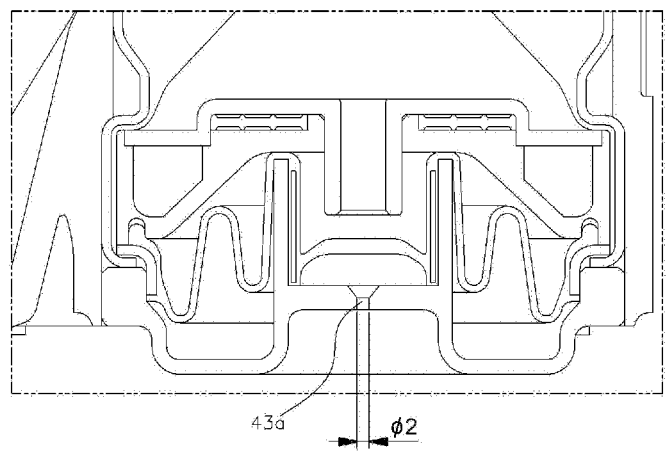
FIGS. 6A-6C are views illustrating various introduction/discharge apertures having different inner diameters for comparison according to an exemplary embodiment to the present invention.
Figure 6B:
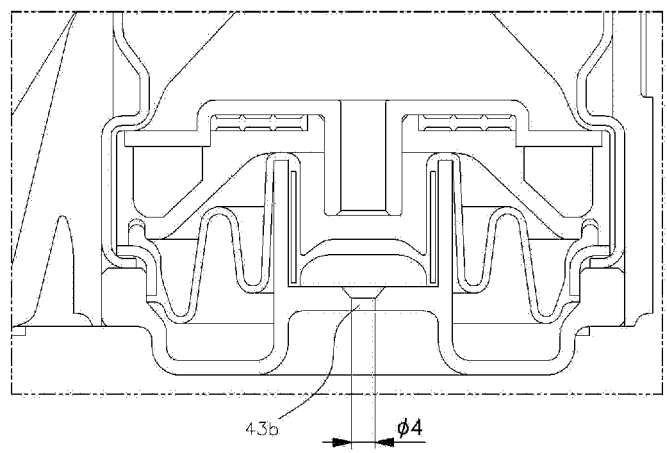
Figure 6C:
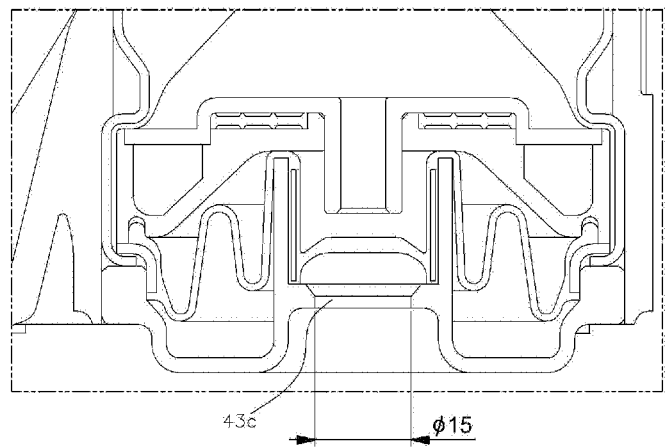

In other words, during idling (i.e. when small-displacement vibrations are input via the insulator 10), as illustrated in FIG. 4, the hydraulic fluid may flow through the second flow path since the hydraulic fluid may not flow through the flow path by the inertia of filled fluid. Accordingly, the volume of the auxiliary fluid chamber may vary and the bottom 21 of the auxiliary fluid chamber may be moved vertically, causing the flow of air through the introduction/discharge aperture 43. As described above, since the flow resistance of air in the introduction/discharge aperture 43 has an effect on variation in the volume of the auxiliary fluid chamber, as illustrated in FIG. 6, increase in vibration attenuation performance (i.e. tuning of the coefficient of loss and dynamic characteristics) may be accomplished by determining the diameters of introduction/discharge apertures 43a, 43b and 43c based on the characteristics of the engine.

Figure 5:
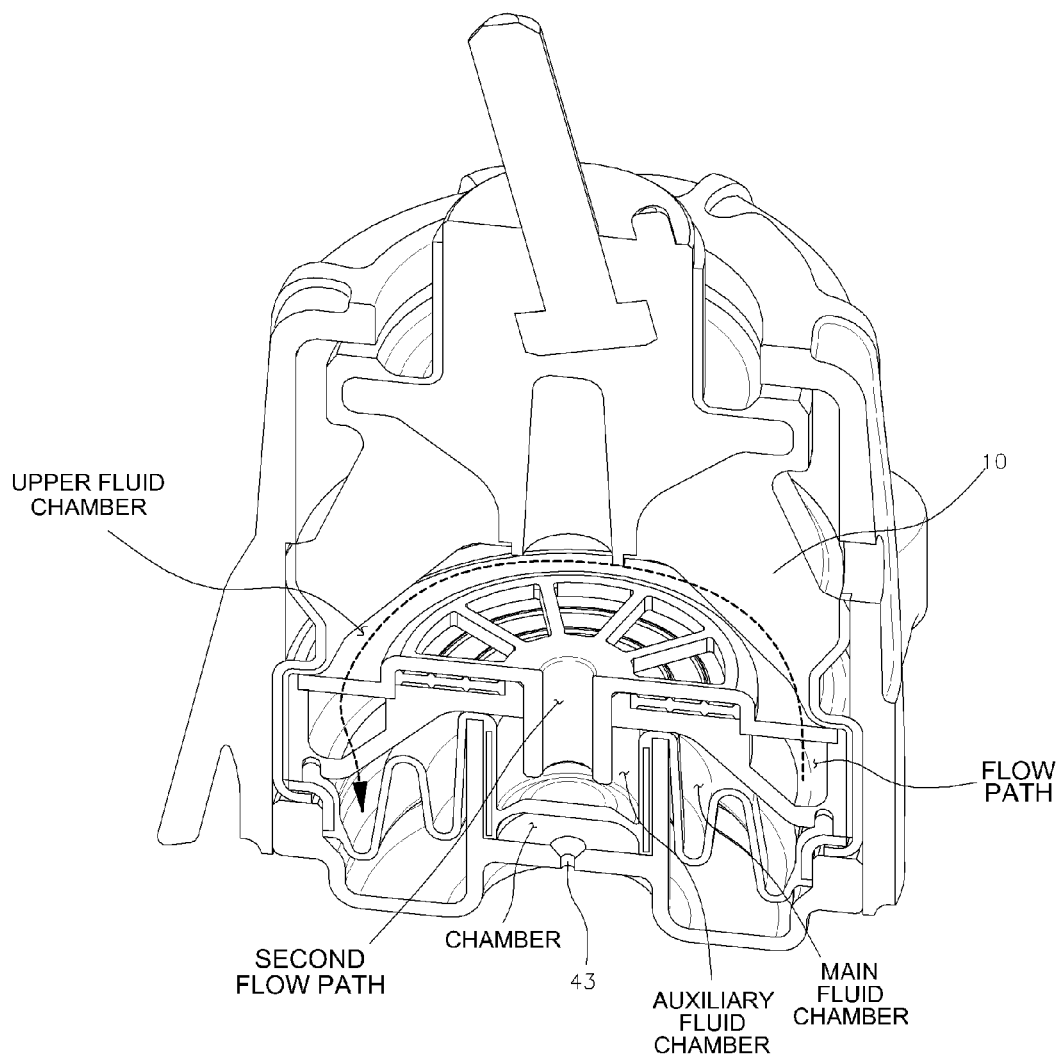
FIG. 5 is a view illustrating the state in which the flow of hydraulic fluid through a flow path occurs when vibrations having a relatively substantial amplitude (large-displacement vibrations) are generated during driving according to an exemplary embodiment to the present invention.

Further, during driving (i.e. when large-displacement vibrations are input through the insulator 10), as illustrated in FIG. 5, the hydraulic fluid may flow through the flow path (e.g., a first flow path) that connects the upper fluid chamber and the main fluid chamber to each other, and minimal hydraulic fluid may flow through the second flow path. Accordingly, minimal variation in the volume of the auxiliary fluid chamber may occur, and therefore air may not flow through the introduction/discharge aperture 43.

Moreover, in the engine mount of the present invention, since the hydraulic fluid may be moved along any one of two paths determined based on the magnitude and characteristics of vibrations input to the engine mount, the vibration attenuation performance of the engine mount may be optimized to correspond to both small-displacement vibrations (e.g., high-frequency vibrations) and large-displacement vibrations (e.g., low-frequency vibrations). In particular, since the size of the introduction/discharge apertures 43a, 43b and 43c may be tuned to various sizes as illustrated in FIG. 6, dynamic characteristics and the coefficient of loss may be more precisely and easily tuned when small-displacement vibrations are input.

As is apparent from the above description, although a conventional active mount is more advantageous than a general hydraulic mount in terms of performance since the damping characteristics may be varied based on the driving conditions, the active mount suffers from increased weight and production costs and the complex arrangement of wiring connected to a drive mechanism therefor, and thus the range of vehicle models to which the active amount may be mounted is limited.

However, in an engine mount of the present invention, the vibration attenuation characteristics thereof may be self-varied to correspond to input vibrations based on the driving conditions, thus having effects similar to the active mount without requiring the additionally mounting of a drive mechanism. Therefore, the manufacturing costs of the engine mount may be substantially reduced compared to that of the active mount, and the increase in weight thereof may be limited.

In other words, in the vehicle development process, whether to apply the general hydraulic mount, which may be easily mounted and is relatively inexpensive, or to apply the active mount, which is relatively expensive but is advantageous in terms of performance, is at issue. In particular, when the active mount is mounted, the installation of wiring required when the drive mechanism is additionally mounted, may become problematic. However, the engine mount having a self-variation characteristic according to an exemplary embodiment of the present invention may maintain the production costs and weight of the general hydraulic mount without change, may realize the characteristics of the active mount, and may omit the additional installation of the drive mechanism and wiring, thereby being applied to a wider range of vehicle models.

Additionally, since engine mounts have conventionally been tuned by changing, for example, an insulator material, and the size and shape of a flow path, the manufacture of prototypes has been difficult. However, in the configuration of the present invention, the characteristics of the engine mount may be tuned by changing the inner diameter of an introduction/discharge aperture, which may enable tuning to be conducted more freely. In other words, tuning may be performed to optimize the vibration attenuation characteristics while idling or while driving according to respective vehicle models by varying the number, inner diameter, shape and position of introduction/discharge apertures.

In addition, in the configuration of the present invention, since a portion configuring an auxiliary fluid chamber may be coupled to a plate and may be in surface contact with a division cup, it may be possible to prevent the generation of shaking (e.g., vibration) noise during the flow of hydraulic fluid. In addition, it may be possible to concentrate the flow of air on the introduction/discharge aperture since the upper end of the introduction/discharge aperture may be shaped to have a diameter thereof that increases in an upward direction.

Furthermore, as an expanded portion having a pipe shape may be formed to extend downward from the underside of a nozzle plate to increase the length of the second flow path, it may be possible to more efficiently tune variation in dynamic characteristics within a specific frequency range (e.g., about 20 Hz to 30 Hz) and to vertically guide the flow of hydraulic fluid to ensure the introduction of air into a chamber, thereby additionally achieving air damping effects.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An engine mount, comprising:
a nozzle plate mounted between an insulator and a diaphragm to divide an interior of the engine mount into an upper fluid chamber and a lower fluid chamber to allow filled hydraulic fluid to flow between the upper fluid chamber and the lower fluid chamber through a first flow path formed in the nozzle plate based on variation in the volume of the interior, wherein the nozzle plate includes a second flow path, an upper end of which communicates with the upper fluid chamber; and a division cup that includes an upwardly protruding portion configured to push the diaphragm from a lower side thereof to divide the lower fluid chamber into a main fluid chamber, which communicates with the first flow path, and an auxiliary fluid chamber, which communicates with the second flow path, wherein a partition is formed inside the protruding portion to form an air chamber below the auxiliary fluid chamber, and an introduction/discharge aperture is formed in the partition to allow air to be introduced into or discharged from the air chamber, wherein an inner circumferential surface of the protruding portion is coupled to a side surface of the auxiliary fluid chamber and is coupled to a portion of the diaphragm in which a plate is fixed, wherein the introduction/discharge aperture has a tapered upper end, a diameter of which increases in an upward direction or wherein a lower end of the introduction/discharge aperture is shaped to have a diameter that decreases in a downward direction, wherein the auxiliary fluid chamber has an upwardly convex bottom, wherein the division cup is fixed to a lower end of a case, which is coupled to an exterior of the diaphragm and the insulator, and wherein the auxiliary fluid chamber is below the nozzle plate.

2. The engine mount according to claim 1, wherein the nozzle plate includes an expanded portion having a pipe shape, and the expanded portion extends downward from the nozzle plate to expand a length of the second flow path.

3. The engine mount according to claim 1, wherein the diaphragm is shaped to have a plurality of pleats, and the protruding portion is configured to push the diaphragm to cause any one of the pleats to abut a bottom of the nozzle plate.

* * * * *